Oct. 23, 1945.  F. W. HELMING  2,387,582
BROACHING APPARATUS
Filed March 18, 1943

INVENTOR.
Fred W. Helming
BY E. C. Sanborn
Attorney

Patented Oct. 23, 1945

2,387,582

UNITED STATES PATENT OFFICE 2,387,582

BROACHING APPARATUS

Fred W. Helming, Waterbury, Conn., assignor to The Bristol Company, Waterbury, Conn., a corporation of Connecticut Application March 18, 1943, Serial No. 479,545

4 Claims. (Cl. 90—33)

This invention relates to broaching operations, and is more particularly concerned with a novel apparatus adapted for use in connection with a screw machine wherein a broaching action forms one of a number of successive operations, of which the majority require rotary motion of the work with respect to the processing tool. In the manufacture of set screws and the like on a production basis, it is customary for the material upon which operations are being performed to be carried in a rotating spindle and to have presented thereto the tools necessary to the several forming operations in the production of a finished unit. It is obvious that if the successive operations can be carried out without bringing to rest the rotating spindle which carries the material, there will be effected a saving in time and also a decided reduction in wear and tear on the machinery.

In some methods of production of screws having a recessed or splined head, it is necessary that certain operations be performed by a broach or similar tool whose motion relative to the workpiece is purely axial or longitudinal. Since it is frequently expedient that said axial component of the forming process be performed between two operations involving rotary motion, it becomes necessary that the workpiece be temporarily brought to a state where it will have no rotary motion with respect to the broach. In the conventional method for performing such operations, it has been customary to make use of a broach rigidly fixed to the tailstock or turret head of the machine, and to present this tool to the workpiece only after the latter has been brought to rest by stopping the motion of the spindle in the headstock.

It is an object of the present invention to provide a means for carrying out the broaching action as one of a series of successive operations without the need for bringing the spindle to rest or in any way altering its velocity.

In the present invention it is proposed to provide a rotatable mounting for the broaching tool, and further to provide means whereby said mounting will automatically be caused to rotate coaxially with, and at the same speed as, the spindle at the time of being presented to the workpiece to carry out the broaching operation. Thus, instead of it being necessary to provide means for bringing the spindle to rest during the broaching operation, it is only required to leave the broaching tool mounting free to rotate as much as may be necessary to maintain the broach at the same angular velocity as the spindle during the broaching operation. Since this involves no actuation of clutches or other starting and stopping devices, the mechanism may be very materially simplified, the wear and tear of operation greatly reduced, and the broaching time reduced to a minimum.

Feb. 3 is a front elevation of the same.

Figures 4, 5:
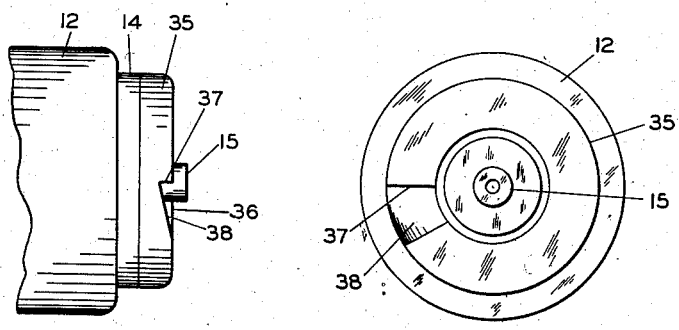

Figs. 4 and 5 are a side and front elevation respectively of a spindle adapted to the purposes of the invention.

Figure 1:
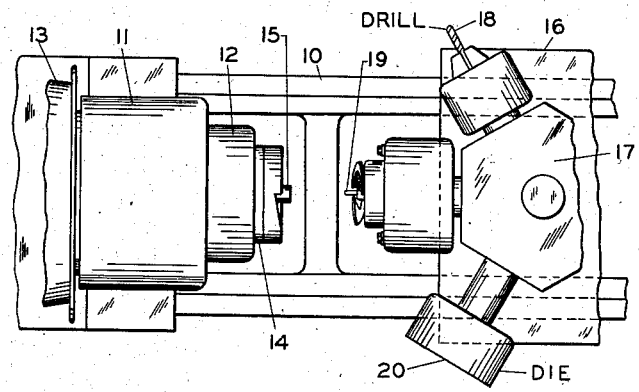
Fig. 1 is a top elevation of a portion of an automatic screw machine including a device embodying the principles of the invention.

In Fig. 1 is shown a top view of a screw machine or turret lathe adapted to the purposes of the invention. Mounted upon a lathe bed 10, is a headstock 11 having therein a rotatable spindle 12 adapted to be rotated about its axis by means of a pulley 13. Carried by the spindle 12 is a chuck 14 adapted to grip a workpiece 15 which is to be subjected to certain forming processes. Slidably mounted upon the lathe bed 10, and adapted for motion therealong in a sense parallel to the axis of the spindle 12, is an apron 16 carrying a turret head 17, which may be rotated with respect to said apron about an axis perpendicular to that of the spindle 12.

Mounted upon the turret head 17 is a plurality of tools or forming elements adapted to perform in a predetermined succession a series of operations upon the workpiece 15. In the drawing are indicated three such tools, viz., a drill 18, a broach 19, and a threading die 20. The turret head 17 may, of course, carry other tools, but the three which have been mentioned are sufficient to illustrate the purposes and principle of the invention. The mechanism for rotating the turret head 17 with respect to the apron 16, and for advancing said apron together with the turret head carried thereby, in order to present to the workpiece 15 such forming elements as may be borne by the turret head, constitutes no part of the present invention, and, being well known to those familiar with this class of machinery, herein requires no further description As an example of a process in which each of these tools forms a part, consideration may be given to certain elements in the machining of a recessed head set screw from a length of bar stock. The stock is represented by the workpiece 15, which is firmly gripped in the rotating chuck 14 for the purpose of having the several desired operations performed thereon. The following operations represent normal practice in the forming of a set screw having a recessed head: The turret head 17 being first so positioned that the drill 18 lies on the axis of the machine, the apron 16 is advanced toward the headstock 17, presenting the drill 18 to the workpiece 15 and causing a hole of the proper depth to be centrally drilled in the projecting end thereof. The apron 16 is then withdrawn, and the turret head 17 rotated to such a position that the broach 19 lies on the axis of the machine. In the art as heretofore practiced, it would now be necessary to bring the chuck 14 to rest, after which the apron 16 carrying the turret head 17 would be advanced, and the broach 19 forced into the hole which had been drilled in the extremity of the workpiece 15. This broach being shaped to a suitable contour (as for example that shown in the set screw fully described and set forth in U. S. Letters Patent 1,075,710, issued to D. S. Goodwin, October 14, 1913), the interior of the recess will thus be given a fluted or splined conformation, adapted for engagement by a similarly conformed wrench. The apron 16 is again retracted, and the broach 19 withdrawn from the recess in the screw, after which it is necessary that the spindle 12 carrying the workpiece 15 again be brought into rotation. The turret head 17 is rotated to such a position that the die 20 is caused to lie on the axis of the machine, after which the turret head is again advanced and the die presented to the projecting portion of the rotating workpiece 15 to form thereon a suitable screw thread.

As hereinbefore noted, my invention enables the broaching action to be accomplished without bringing the spindle 12 to rest or in any way altering its velocity. This may be effected by means such as illustrated in Figs. 2-5 of the drawing.

Figures 2, 3:
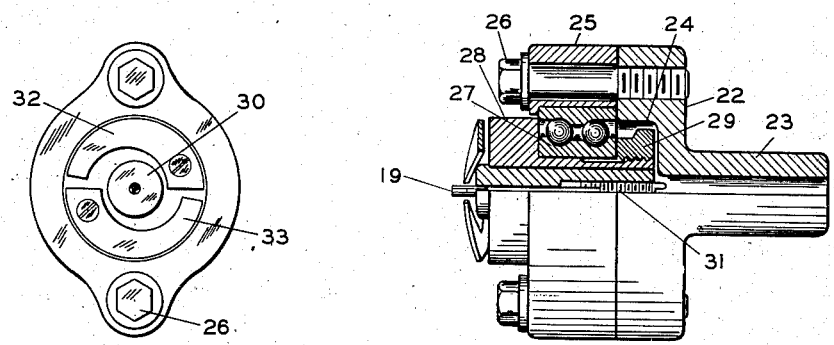
Fig. 2 is a side elevation partly in section of a broach mounting embodying the principles of invention.

More particularly, in Fig. 2 is shown a side elevation, partly in section, of a mounting which permits free rotation of the broach 19. A base portion 22, having a projecting cylindrical shank 23 adapted to be fixed within the turret head 17 of the screw machine, is provided with a recess 24 and a clamping plate 25 adapted to be secured to the base portion 22 by means of suitable bolts 26, and to form therewith a housing for a ball-bearing member 27 of a type especially adapted to resist thrust or axial stresses. Carried within the ball-bearing 27, and free to rotate with the inner portion thereof is a collet 28 secured to said bearing by means of a nut 29 freely rotatable with said collet in the recess 24. Centrally fitted within the collet 28 and secured therein by a set screw or other suitable clamping means, not shown in the drawing, is a bushing 30 adapted to support the broach 19 by engagement with a suitably threaded screw 31 abutting upon the rearward end of said broach.

Secured to the front end of the collet 28 is a pair of helically formed semi-circular springs 32 and 33, normally projecting a slight distance axially from the surface of said collet, but adapted to be compressed into substantial engagement therewith under the action of a longitudinal force.

Secured to the chuck 14 is a ring 35, shown in Figs. 4 and 5, and having in the surface thereof a notch 36 formed by the intersection of a plane surface 37 parallel to the axis of rotation of the chuck and a bevelled surface 38, and so disposed that as the broaching element is juxtaposed thereto the extremity of one or other of the springs 32, 33, will be engaged by the surface 37, causing the collet 28 to assume the rotation of the chuck 14 and the broach thus to be rotated at the same velocity as the workpiece 15. As the broach is farther advanced it will engage the workpiece 15 and will enter the previously drilled hole in the end thereof, and will carry out its broaching operation in the same manner as though both the workpiece and the broach were devoid of angular rotation. As the broach is forced to the bottom of the recess, the springs 32, 33 will yield sufficiently to permit free axial motion of the broaching tool; and as said tool is withdrawn, said springs will assist in clearing the broach from the workpiece.

While the springs 32 and 33 provide means for bringing the rotating collet 28 up to the same speed as the chuck 14 before any stress is applied to the broach 19, it has been found in the smaller sizes of the device, where the inertia of the movable parts is relatively low, that these springs may be omitted, and that upon its first engagement with the recess in the workpiece 15 the broach 19, together with the collet 28 and associated parts, will assume the angular velocity of the chuck 14 without damage or objectionable strain. Upon withdrawal of the broach 19 from the workpiece 15, the turret head 17 will be advanced to a new position, and the threading operation carried out by the die 20 as hereinbefore described.

The terms and expression which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. Broaching apparatus comprising holding means for a workpiece, means for rotating said holding means, a broaching tool holding means adapted to be rotated about the axis of said workpiece and simultaneously advanced along said axis with respect to said workpiece, and means cooperating with the first mentioned holding means for transmitting to said broaching tool rotary movement about only the axis of said workpiece, said transmitting means comprising a helically conformed spring extending from one of said holding means and adapted to engage one of its ends with a portion of the other of said holding means prior to engagement of said broach with said workpiece and thereby to act as a driving member for said broach in a circumferential sense while remaining resilient in an axial sense.

2. Broaching apparatus comprising holding means for a workpiece, means for rotating said holding means, a broaching tool holding means adapted to be rotated about the axis of said workpiece and simultaneously advanced along said axis with respect to said workpiece, and means cooperating with the first mentioned holding means for transmitting to said broaching tool rotary movement about only the axis of said workpiece, said transmitting means comprising a leaf spring extending from one of said holding means and adapted to engage a portion of the other of said holding means prior to engagement of said broach with said workpiece and thereby to relieve said broach of undesirable torsional stresses in initiating said rotation thereof.

3. Broaching apparatus comprising holding means for a workpiece, means for rotating said holding means, a broaching tool holding means adapted to be rotated about the axis of said workpiece and simultaneously advanced along said axis with respect to said work piece, and means cooperating with the first mentioned holding means for transmitting to said broaching tool rotary motion about only the axis of said workpiece, said transmitting means comprising a spring extending from one of said holding means towards the other and of such length as to engage a portion of the other of said holding means prior to engagement of said broaching tool with said workpiece for driving said broaching tool while remaining axially resilient and relieving said tool of undesirable stresses in initiating said rotation thereof.

4. Broaching apparatus comprising holding means for a workpiece, means for rotating said holding means, a broaching tool holding means movable axially of said workpiece and also free for rotation with said workpiece for forming rectilinear surfaces on said workpiece, and means interposed between the last mentioned holding means and the means for rotating said workpiece for transmitting rotary movement from said rotating means to said broaching tool, said transmitting means comprising a spring of such length as to transmit rotation to said broaching tool while remaining axially resilient.

FRED W. HELMING.